(12) United States Patent
Gledhill

(10) Patent No.: US 6,644,884 B2
(45) Date of Patent: Nov. 11, 2003

(54) ROTATIONAL SPRING CLIP FOR CONNECTING A MALE COMPONENT TO A FEMALE COMPONENT

(75) Inventor: Steven Anthony Gledhill, Old Saybrook, CT (US)

(73) Assignee: Roro Frank of America, Inc., Essex, CT (US)

( * ) Notice: Subject to any disclaimer, the term of this patent is extended or adjusted under 35 U.S.C. 154(b) by 106 days.

(21) Appl. No.: 09/795,743

(22) Filed: Feb. 28, 2001

(65) Prior Publication Data

US 2002/0119000 A1 Aug. 29, 2002

(51) Int. Cl.[7] .............................................. F16B 11/00
(52) U.S. Cl. ........................ 403/317; 49/394; 49/248; 403/315; 403/316; 403/319
(58) Field of Search ..................... 49/246, 248, 249, 49/324, 326, 333, 366, 394, 300, 289, 90, 260; 16/324, 362, 326, 333, 366; 403/261, 230, 256, 317, 315, 316, 319, 321, 322.4, 49, 154, 155; 292/DIG. 20, DIG. 33

(56) References Cited

U.S. PATENT DOCUMENTS

| 868,082 | A | * | 10/1907 | Freschl | ........................... 24/24 |
|---|---|---|---|---|---|
| 1,217,640 | A | * | 2/1917 | Roebuck | ....................... 24/649 |
| 3,920,147 | A | * | 11/1975 | Hiatt | ............................ 220/94 |
| 3,984,191 | A | * | 10/1976 | Doty | ............................ 403/69 |
| 5,323,568 | A | * | 6/1994 | Blomqvist | ..................... 49/248 |
| 5,964,011 | A | * | 10/1999 | Ruston et al. | ................. 16/239 |
| 6,112,371 | A | * | 9/2000 | Trmblay | ....................... 16/362 |

FOREIGN PATENT DOCUMENTS

| GB | 2225377 | * | 5/1990 | ................... 49/394 |
|---|---|---|---|---|

\* cited by examiner

Primary Examiner—Lynne H. Browne
Assistant Examiner—Michael P. Ferguson
(74) Attorney, Agent, or Firm—Marshall, Gerstein & Borun

(57) ABSTRACT

A rotational spring clip is provided for connecting a male component to a female component. The spring clip is pivotally secured to a female component. The male component includes a male member that extends through a hole in the female component. The spring clip is then rotated to engage the male component with a structure that includes two spaced apart legs that define an open mouth. The legs of the clip are trapped between a flange formed at the outer distal end of the male member that extends through and beyond the female component. The legs of the clip are then frictionally trapped between the flange of the male member and an outer surface of the female component.

14 Claims, 6 Drawing Sheets

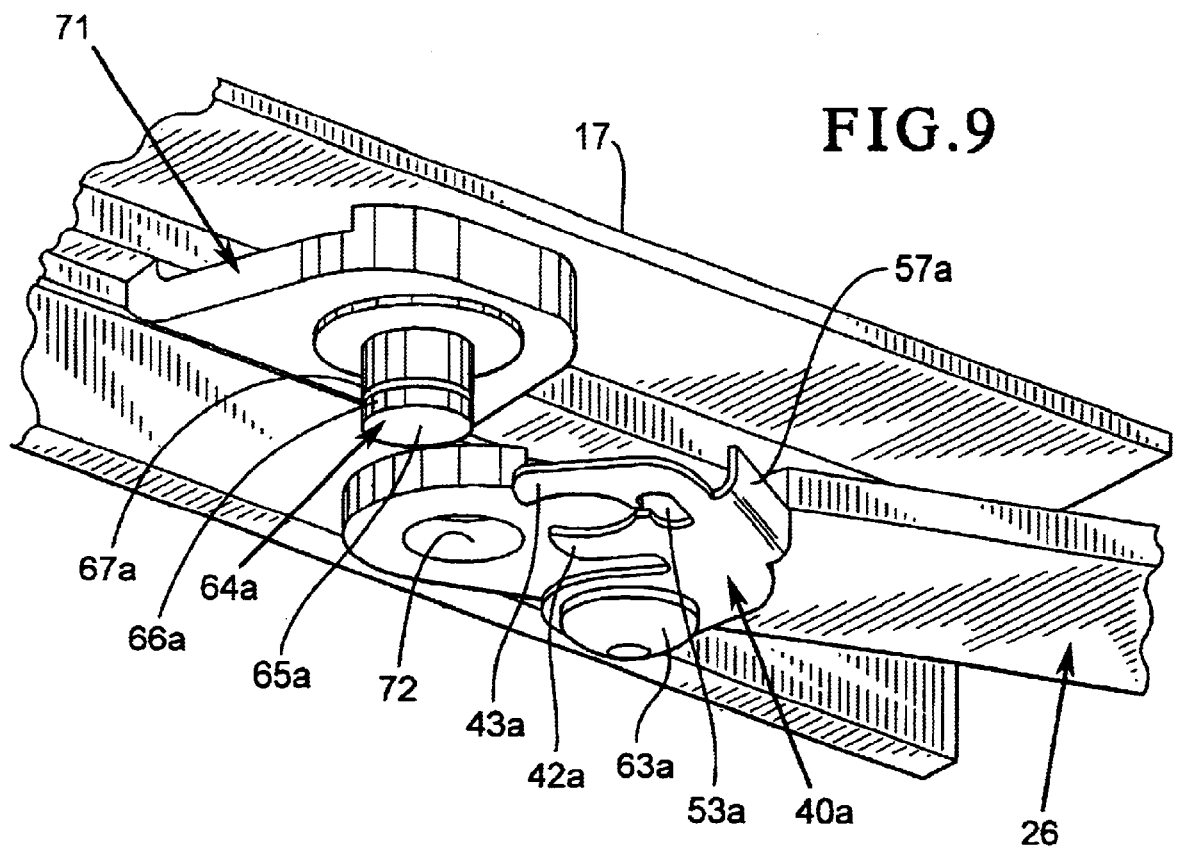
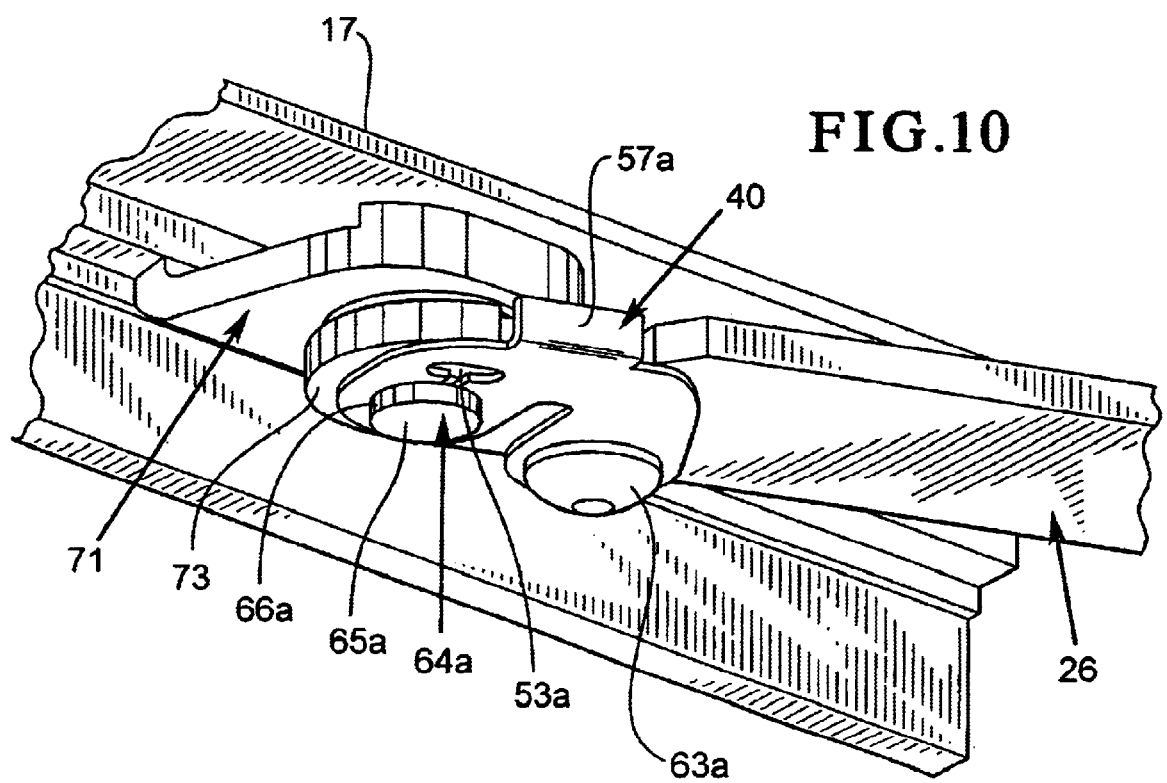

ROTATIONAL SPRING CLIP FOR CONNECTING A MALE COMPONENT TO A FEMALE COMPONENT

FIELD OF THE INVENTION

The present invention relates generally to removable connecting clips for connecting a male component to a female component. More specifically, the present invention relates to a clip used to connect a rotational pivot pin to another, female component.

BACKGROUND OF THE INVENTION

In the art of casement windows, it is known to use a quick release attachment component to allow the arms of the casement operator to be disconnected from the moveable sash. A conventional quick release component is illustrated in FIGS. 1A and 1B in the form of the spring clip 10. Specifically, the spring clip 10 is slidably attached to the operator arm 11 by the bolt 12 which is slidably received in the slot 13. The arm 11 includes a hole 14 for receiving the male pivot pin 15 which is riveted to the bracket 16. The bracket 16 is mounted to the underside of the sash 17 (see FIG. 2). The pivot pin 15 includes a distal end 18 having a circumferential groove 19 that results in the formation of a flange 21.

As shown in FIG. 1B, the hole 14 of the arm 11 is slid over the pivot pin 15 so that the distal end 18, the flange 21 and the groove 19 of the pin 15 are exposed. The clip 10 is then slid forward so that the open mouth 22 of the clip 10 that is formed by the legs 23, 24 is received in the groove 19 of the pivot pin 15. To disconnect the arm 11, a tool is inserted into the opening 25 in the clip 10 which provides a grip so that the clip 10 can be moved from the connected position shown in FIG. 1B to the right thereby removing the open mouth 22 of the clip 10 from the pivot pin 15.

As shown in FIG. 2, such a quick disconnect mechanism can be utilized in a variety of ways in the field of casement windows. Specifically, a spring clip can be used to connect the arm 26 to the sash 11 or to connect the arm 27 to the bracket 28. A clip may also be used to connect the arm 26 to the bracket 29. The operator 31 shown in FIG. 2 is but one of many different styles of casement window operators. Hence, the application of the present invention is not limited to any specific type or style of casement window hardware. Further, the improved spring clip of the present invention is also not limited to casement window hardware. In fact, the present invention has applications to all areas where rotational pivot pins need to be secured to another, female component.

Numerous problems are associated with the use of the conventional spring clip 10 illustrated in FIGS. 1A and 1B. First, the fabrication of the clip 10 is expensive and involves a complex production and complex assembly tooling. Specifically, the clip 10 needs to be wrapped around the arm 11 or manufactured with a rectangular cross section to enable the clip 10 to slide onto the arm 11. Thus, the use of the clip 10 is limited by its shape and, accordingly, it can only be used on a single style or size of arm 11.

For window installers, a tool is required to engage the clip 10 at the slot or opening 25 or at the bolt 12. For window fabricators, this increases the difficulty of assembly and slows down the manufacturing process. Homeowners also dislike these components as they are prone to scratching the visible surface of the arm 11.

Accordingly, there is a need for a more versatile quick disconnect clip which will enable a component with a male member or pivot pin to be releasably secured to another, female component which avoids the disadvantages of the prior art as discussed above.

SUMMARY OF THE INVENTION

The present invention satisfies the aforenoted need by providing a clip for detachably connecting a male component to a female component wherein the female component has a hole and the male component has a male member that is pivotally received in the hole of the female component. The male member has a distal end with a flange. The male member extends through the hole in the female component so that the distal end of the male member and the flange are disposed beyond the female component. The clip is pivotally connected to one of the male or female components. The clip comprises two spaced apart legs that form an open mouth for receiving the distal end of the male member so that the legs of the clip are disposed between the flange of the male member and the female component thereby pivotally securing the male member, and therefore the male component to the female component.

In a first refinement of the present invention, the legs of the clip frictionally engage the flange of the male member and the female component.

In another refinement of the present invention, each leg of the clip further comprises a distal end and a base end. The distal ends of the legs define the open mouth. The base end of each leg comprises an inwardly extending land. The lands of the legs extend towards each other and define a slot disposed between the two lands. The base ends of the legs are connected to each and further define an elongated channel disposed transversely to the slot.

In another refinement of the present invention, the clip comprises a body. The body has two halves, both of the legs being connected to a first half and the first half of the body being connected to a second half of the body by a connecting section. The second half of the body is pivotally connected to one of the male and female components.

In still a further refinement of the present invention, the second half of the clip body is pivotally connected to the female component.

In another refinement of the present invention, the second half of the clip body is riveted to the female component.

In yet another refinement of the present invention, the connecting section comprises a vertically extending push tab which facilitates movement of the clip from a position where the legs and open mouth of the clip are not engaged with the male member or pivot pin to a position where the legs and open mouth of the clip are received between the flange of the pivot pin and the female component.

BRIEF DESCRIPTION OF THE DRAWINGS

For a more complete understanding of the present invention, reference should now be made to the embodiments illustrated in greater detail in the accompanying drawings and described below by way of examples of the present invention.

In the drawings:

FIG. 9 is a bottom perspective view of a spring clip made in accordance with the present invention as installed onto an arm of a casement window operator and a bracket with a pivot pin as installed onto a moveable sash; and FIG. 10 is an illustration of the sash, bracket, arm and spring clip shown in FIG. 9 with the arm mounted onto the pivot pin and the spring clip rotated to an attached position.

It should be understood that the drawings are not necessarily to scale and that the embodiments are illustrated by diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1A:
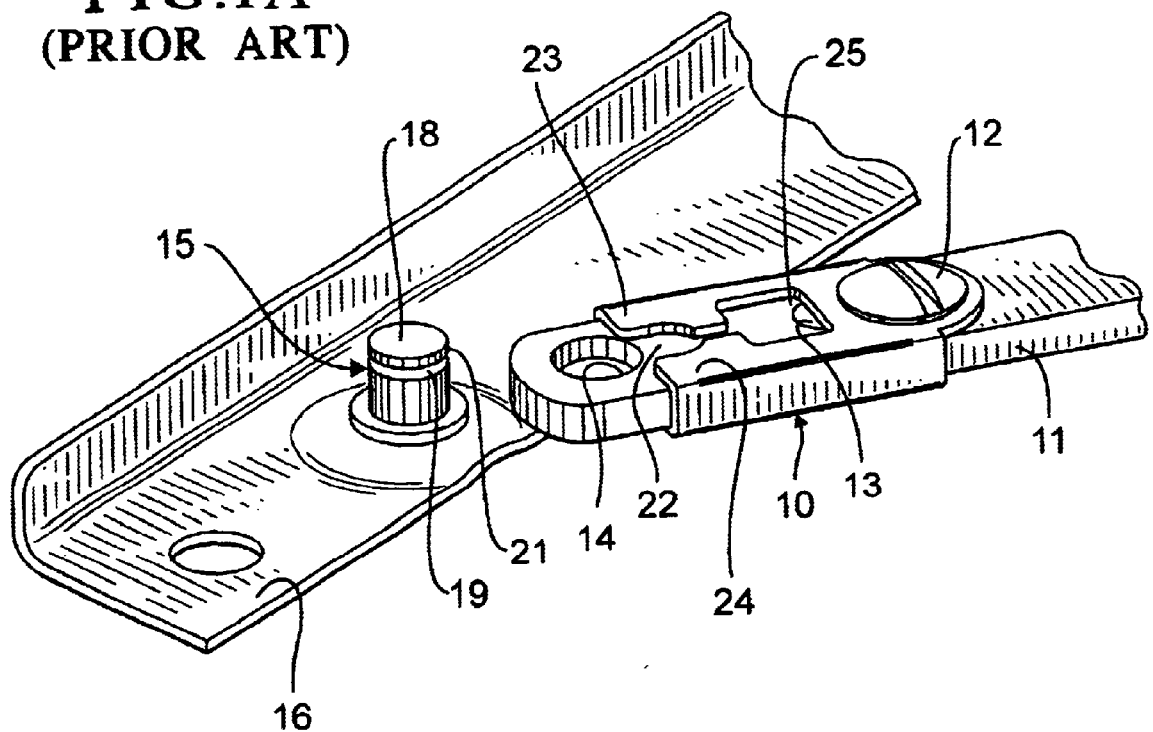
FIG. 1A is an illustration of a prior art clip for detachably connecting an arm to a pivot pin that is riveted to a bracket, the arm and clip being shown in a disconnected position.
Figure 1B:
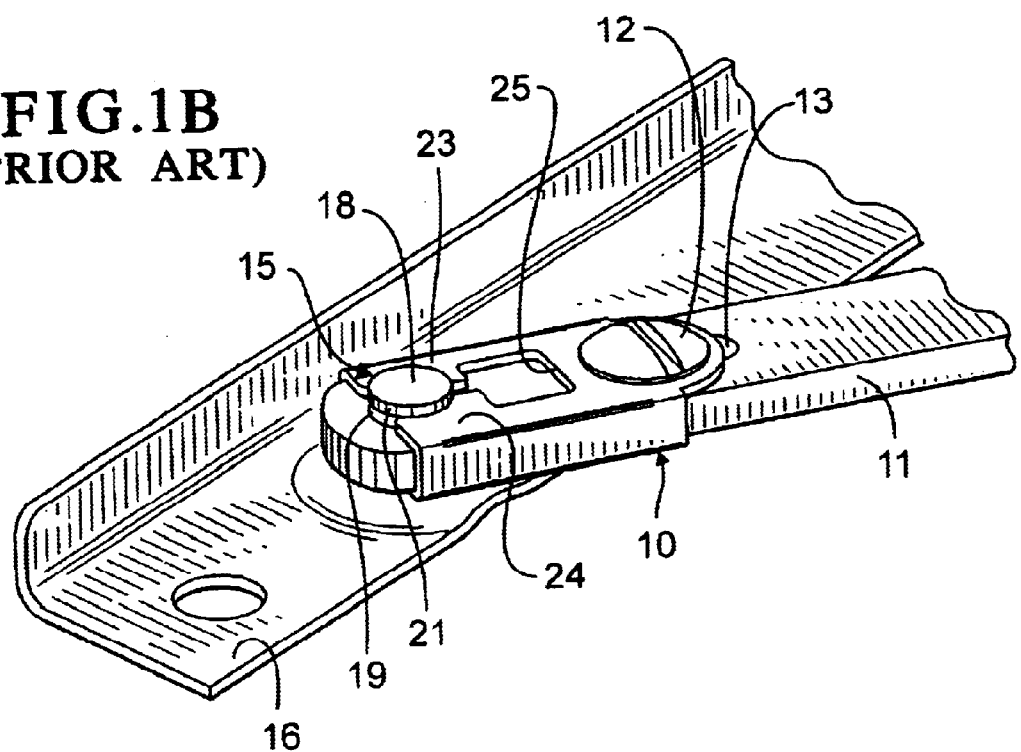
FIG. 1B is an illustration of the clip, arm and bracket shown in FIG. 1A in a connected position.
Figure 2:
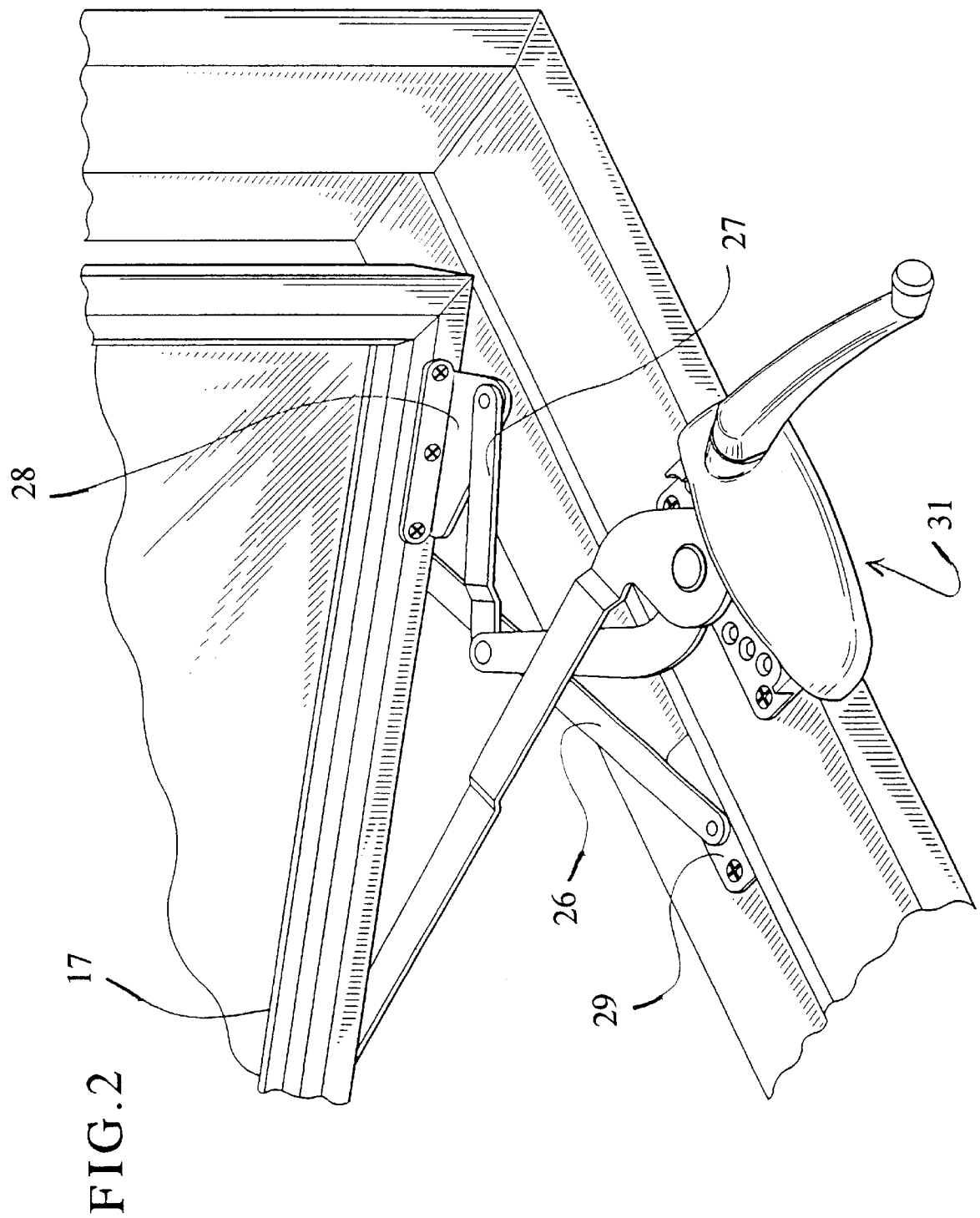
FIG. 2 is a partial perspective view of a casement window in an open position.
Figure 3:
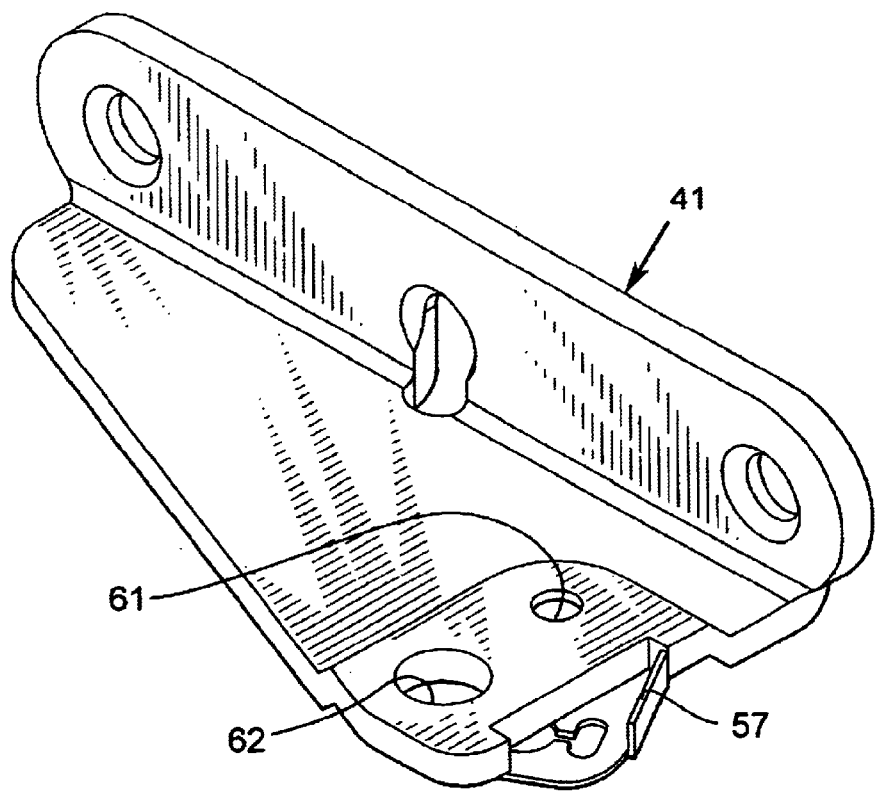
FIG. 3 is a perspective view of a female component in the form of a bracket equipped with the rotational or pivotal spring clip of the present invention.
Figure 4:
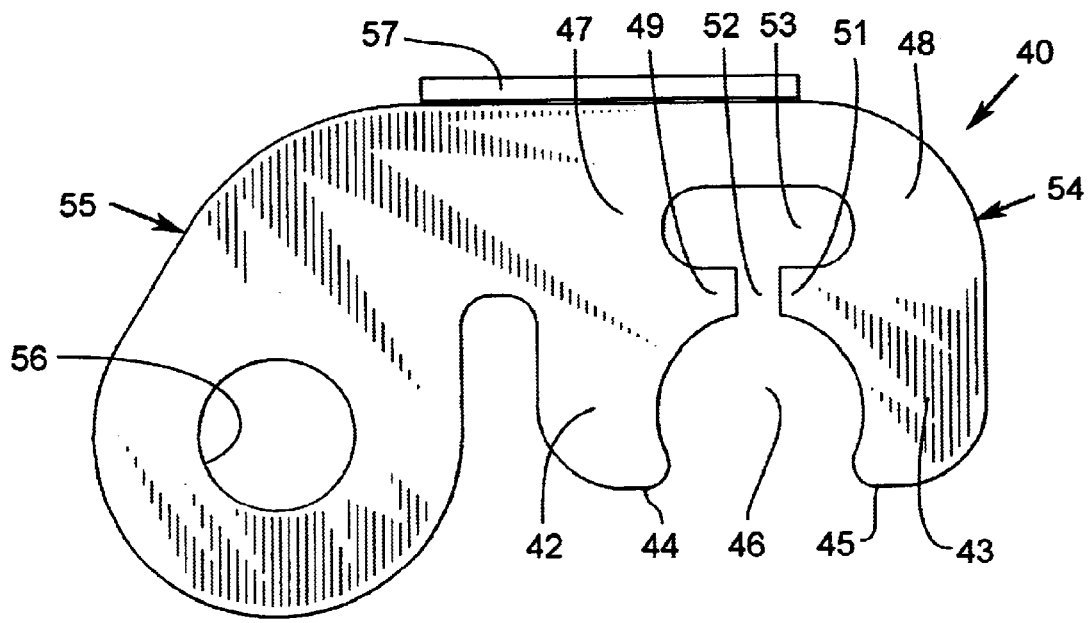
FIG. 4 is a top plan view of the spring clip shown in FIG. 3.

FIGS. 3 and 4 illustrate a spring clip 40 made in accordance with the present invention as attached to a bracket 41. The bracket 41 may be useful for connecting an arm of an operator to a moveable sash. However, as noted above, the present invention is not limited to casement window application and can be utilized to connect any female component to a male component in a pivotable manner.

Turning to FIG. 4, the clip 40 includes two spaced apart legs 42, 43 having distal ends 44, 45 respectively that define an open mouth 46. The legs 42, 43 also include base ends 47, 48 respectively that are connected together. The base ends 47, 48 include inwardly projecting lands 49, 51 respectively that define a slot 52 disposed therebetween. The base sections 47, 48 of the legs 42, 43 also define a transverse channel shown at 53.

The clip 40 essentially includes two halves including a first half 54 and a second half 55. The second half 55 of the clip 40 includes a hole 56 which is used to rivet or otherwise pivotally secure the clip 40 to either a male or female component.

Figure 5:
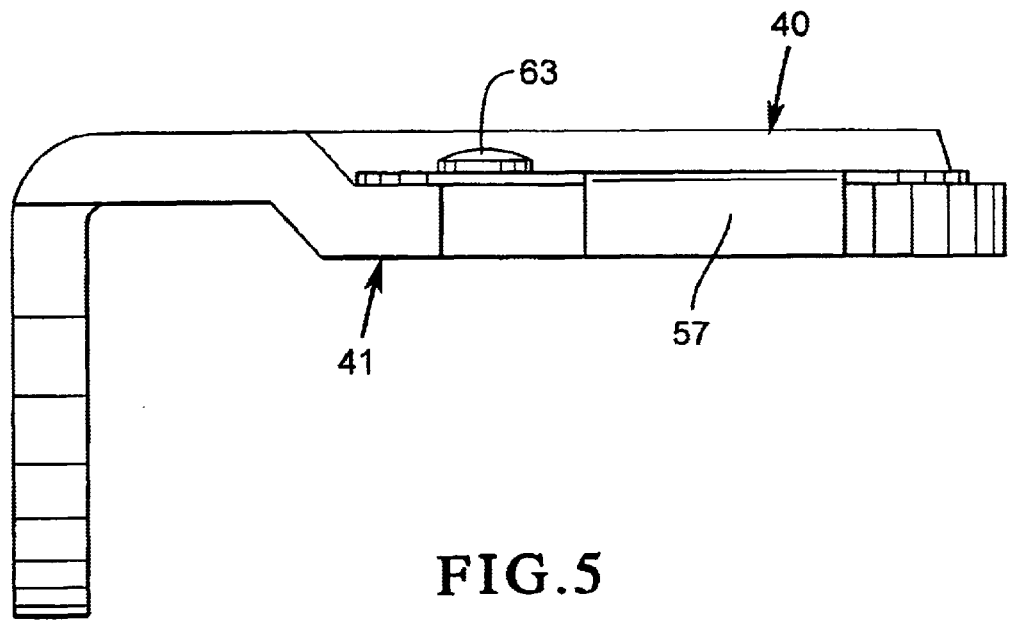
FIG. 5 is an end view of the bracket and spring clip shown in FIG. 3.
Figure 6:
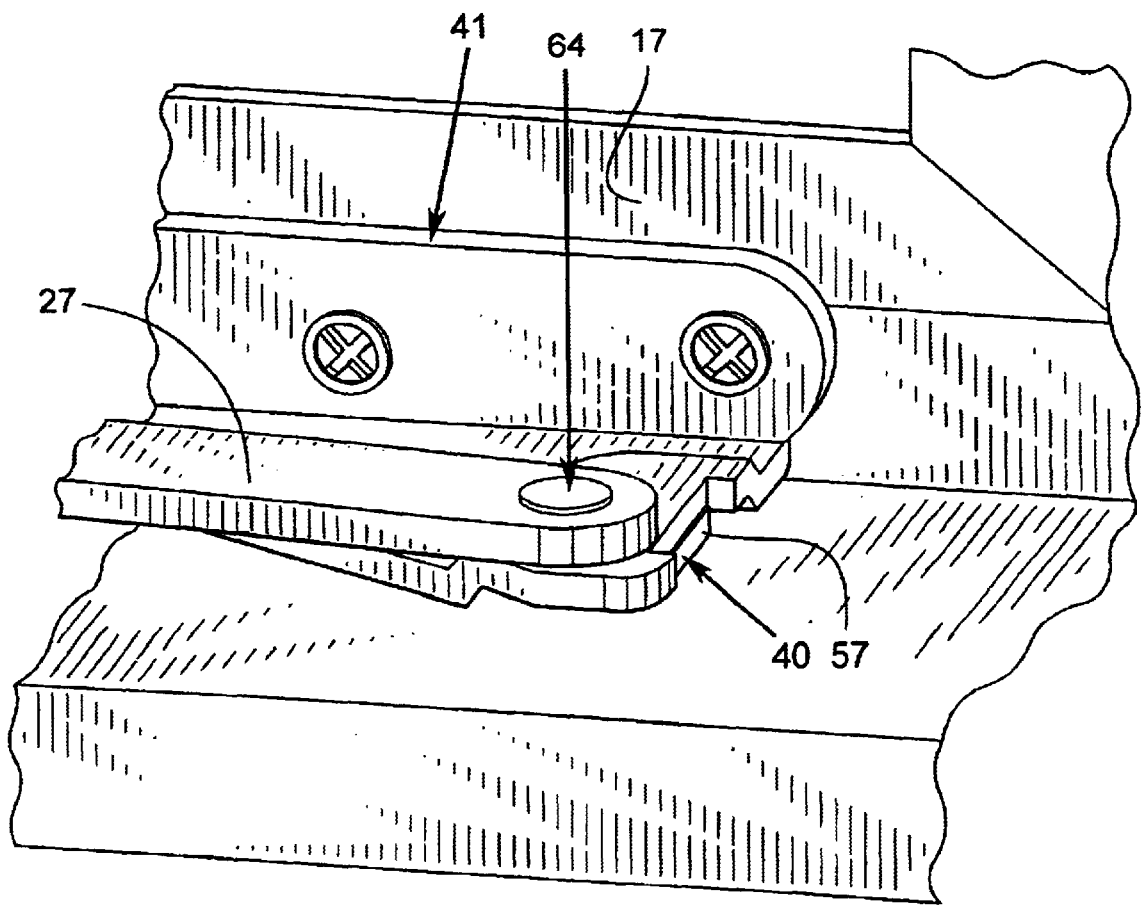
FIG. 6 is a partial perspective view of the bracket and spring clip shown in FIG. 3 as installed on a moveable sash of a casement window and connected to an arm of a casement window operator.
Figure 7:
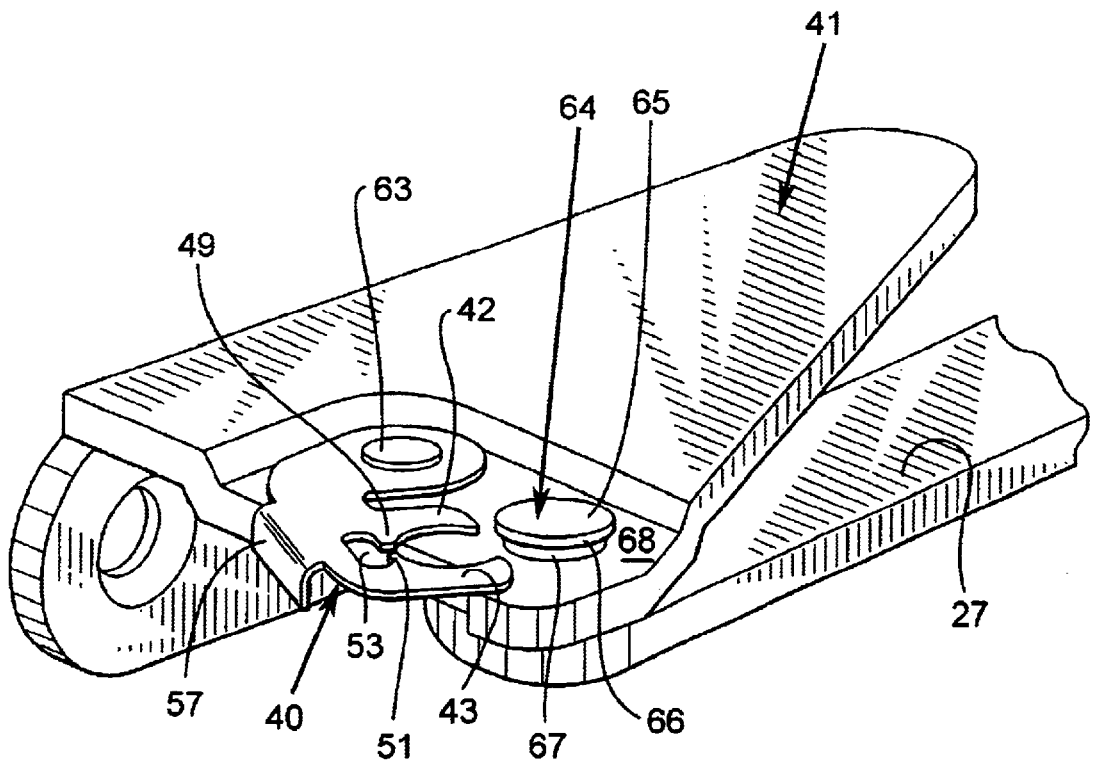
FIG. 7 is a bottom perspective view of the bracket, clip and arm shown in FIG. 6 with the spring clip in a disengaged position.
Figure 8:
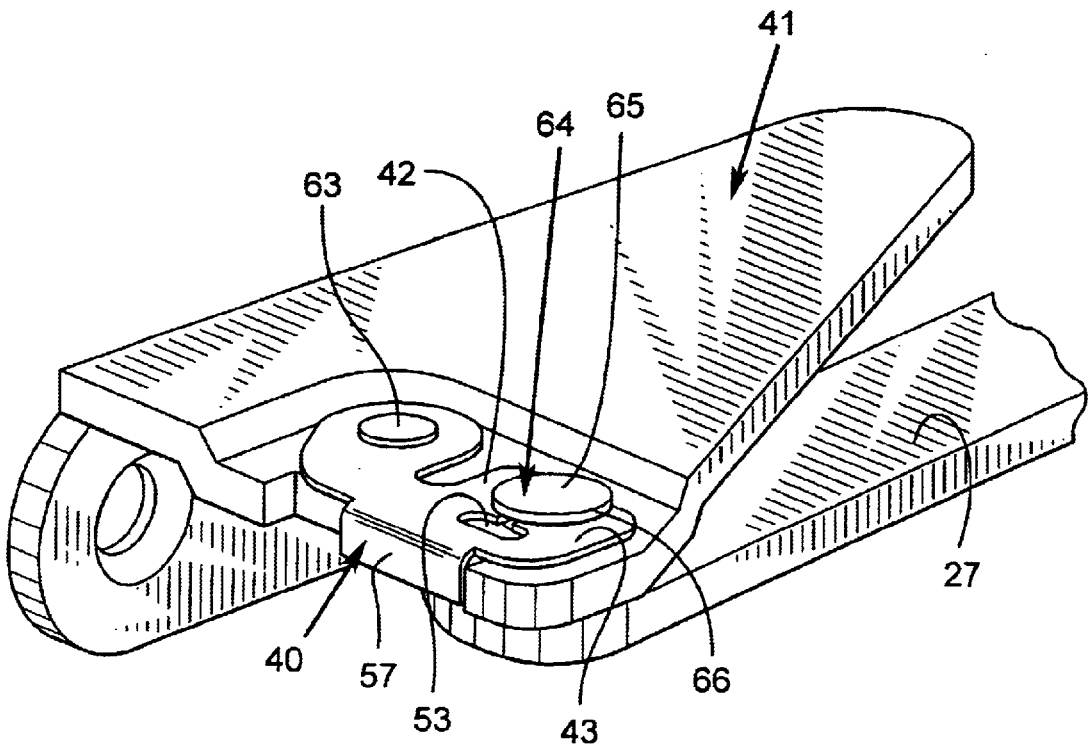
FIG. 8 is a bottom perspective view of the arm, bracket and spring clip shown in FIG. 7 with the spring clip in an engaged position.

As best shown in FIG. 3, the clip 40 also includes an upwardly extending tab 57 which facilitates movement of the clip 40 to the engaged or connected position. The transverse channel 53, on the other hand, facilitates the movement of the clip 40 to a disengaged position by providing a convenient gripping place for a flathead screwdriver. The bracket 41 includes a hole 61 which receives a rivet or other pivotal connection that extends through the hole 56 of the clip 40. The bracket 41 also includes a hole 62 for receiving a male member, such as a pivot pin as shown in FIGS. 6–8. Referring to FIG. 5, a connector 63 is shown that pivotally connects the second half 55 of the clip 40 to the bracket 51.

Turning to FIG. 6, the bracket 41 is connected to a sash 17. An arm 27 is pivotally connected to the bracket 41 by the spring clip 40, of which only the tab 57 is visible in FIG. 6. As shown in FIGS. 6–8, the arm 27 includes a male member in the form of a pivot pin 64. Turning to FIGS. 7–8, the pivot pin 64 includes a distal end 65 that features a flange 66. The flange 66 may be defined by a groove shown at 67 in FIG. 7. As shown in FIG. 7, the male member or pivot pin 64 of the arm 27 is inserted through the hole 62 (see FIG. 3) of the bracket 41 so that the distal end 65 and flange 66 extend beyond the body of the bracket 41. The clip 40 is rotated from the position shown in FIG. 7 to the position shown in FIG. 8 to pivotally secure the male member 64 and therefore the arm 27 to the female component or bracket 41. The legs 42, 43 of the clip 40 frictionally engage the underside of the flange 66 or the slot 67 of the pivot pin 64 as well as the surface 68 of the bracket 41 to frictionally secure the clip 40 in place, as shown in FIG. 8. Movement of the clip 40 from the position shown in FIG. 8 to the position shown in FIG. 7 is easily facilitated by insertion of a screwdriver head or other similar tool in the transverse slot 53. Movement of the clip 40 from the position shown in FIG. 7 to the position shown in FIG. 8 is easily achieved by applying thumb pressure to the tab 57.

Turning to FIGS. 9 and 10, the present invention is shown as a means for connecting an operator arm 26 to the underside of the sash 17. Specifically, the sash 17 is equipped with a bracket 71 with a male member or pivot pin 64a. As shown in FIG. 10, the hole 72 of the arm 26 is received over the pivot pin 64a so that the distal end 65a and flange 66a extend beyond the hole 72 of the arm 26. The clip 40a is then pivoted from the position shown in FIG. 9 to the position shown in FIG. 10 by application of thumb pressure to the tab 57a. The legs 42a and 43a of the clip 40a are frictionally received between the flange 66a and the surface 73 of the arm 26. Again, movement of the clip 40a from the position shown in FIG. 10 to the position shown in FIG. 9 is easily achieved by applying pressure with a screwdriver to the transverse slot 53a.

Thus, an improved spring clip for pivotally connecting male and female components is shown and described. It will be noted that in each embodiment, the spring clip 40 or 40a is pivotally connected to the female component, either the bracket 41 or the arm 26. However, those skilled in the art will realize that the spring clip can also be pivotally connected to the male component as well. Specifically, the spring clip could be pivotally connected to the male component and shaped so that it could pivot towards the male member and engage the distal end of the male member after the female component has been inserted over the male member.

While only certain embodiments have been set forth, alternative embodiments and various modifications will be apparent from the above description to those skilled in the art. These and other alternatives are considered equivalents and within the spirit and scope of the invention.

What is claimed is:

1. A combination of a clip male component and female component, the combination comprising:

a clip for detachably connecting a distal end of a male component to a distal end of a female component wherein the distal end of the female component comprises a hole and the distal end of the male component comprises a male member that is pivotally received in the hole of the female component, the male member having a terminal end with a flange, the male member extending through the hole in the female component so that the terminal end of the male member and the flange are disposed beyond the female component, the clip being pivotally connected to the distal end of one of the male or female components, the clip comprising a body, the body comprising two halves, including a first half and a second half, the first half being connected to the second half by a connecting section, the first half of the body comprising two spaced apart legs that form an open mouth for receiving the terminal end of the male member so that the legs of the clip are disposed between the flange of the male member and the female component thereby pivotally securing the male member, and therefore the male component, to the female component, the second half of the body being pivotally connected to one of the male or female components, the connecting section of the body comprising a vertically extending push tab which facilitates movement of the clip from a position where the legs and open mouth of the clip are not engaged with the male member to a position where the legs and open mouth of the clip are received between the flange of the male member and the female component, the male or female component to which the clip is pivotally connected further comprising a recess for accommodating the push tab when the clip is in the position where the legs and open mouth of the clip are received between the flange of the male member and the female component.

2. The combination of claim 1 wherein the legs of the clip frictionally engage the flange of the male member and the female component.

3. The combination of claim 1 wherein each leg of the clip further comprises a distal end and a base end, the distal ends of the legs defining the open mouth, the base end of each leg comprising an inwardly extending land, the lands of the legs extending towards each other and defining a slot disposed between the two lands, the base end of the legs being connected to each other and further defining an elongated channel disposed transversely to said slot.

4. The combination of claim 1 wherein the second half of the clip body is pivotally connected to the female component.

5. The combination of claim 1 herein the second half of the clip body is riveted to the female component.

6. A combination of a rotational spring clip and a support structure wherein the rotational, is adapted to be rotatably connected to a support structure comprising a first support member having a distal end with a hole for receiving a pivot pin disposed on a distal end of a second support member, the rotational spring clip comprising:
a body;
an attachment member disposed on the body and defining an axis, the attachment member adapted to rotatably attach the body to the distal end of the first support member so that the body is capable of rotating about the axis;

the body comprising first and second legs directed away from the axis and forming an open mouth adapted to accept the pivot pin so that, when the attachment member is attached to the first support member, the body being capable of rotating about the axis causing open mouth to engage and disengage the pivot pin; and a flange attached to the body and adapted to facilitate movement of the body about the axis;

the first support member comprising a recess for accommodating the flange attached to the body of the clip when the open mouth of the clip engages the pivot pin of the second support member.

7. The combination of claim 6 wherein the body is substantially flat.

8. The combination of claim 6 wherein each of the legs includes a distal end defining an opening for receiving the pivot pin and wherein a width of the opening is slightly less than a diameter of the pivot pin.

9. A bracket assembly for use in a casement window comprising:

a male component comprising a distal end having a pivot pin;

a female component comprising a distal end having a pivot pin receiving hole adapted to receive the pivot pin, the female component further comprising a recess;

a rotational spring clip including a body, an attachment member for attaching the body to the distal end of the female component and first and second legs on the body directed away from the attachment member and forming an open mouth for receiving the pivot pin, wherein the attachment member defines an axis of rotation and is adapted to enable rotation of the body about the axis of rotation so that, when the rotational spring clip is mounted to the female component and when the pivot pin is disposed through the pivot pin receiving hole of the female component, rotation of the rotational spring clip about the axis of the rotation causes the open mouth to frictionally receive the pivot pin; and wherein the body further comprises a flange attached to the body and adapted to facilitate movement of the body about the axis of rotation, the flange being received in the recess of the female component when the open mouth engages the pivot pin.

10. The bracket assembly of claim 9 wherein the pin is substantially flat.

11. The bracket assembly of claim 9 wherein each of the legs includes a distal end defining an opening for the open mouth, and wherein a width of the opening is slightly less than a diameter of the pivot pin.

12. The bracket assembly of claim 9 wherein the pivot pin includes a groove and wherein the open mouth of the rotational spring clip is adapted to engage the groove of the pivot pin.

13. The bracket assembly of claim 9 wherein the female component is a bracket and the male component is a linkage arm.

14. The bracket assembly of claim 9 wherein the female component is a linkage arm and the male component is a bracket.

* * * * *